(12) United States Patent
Ploof et al.

(10) Patent No.: US 9,372,000 B2
(45) Date of Patent: Jun. 21, 2016

(54) OVEN WITH RECIRCULATION OF COMBUSTION EXHAUST GASES

(71) Applicants: Michael J. Ploof, Puyallup, WA (US); Robert Keehan, Graham, WA (US); Joseph V. Nelson, Orting, WA (US)

(72) Inventors: Michael J. Ploof, Puyallup, WA (US); Robert Keehan, Graham, WA (US); Joseph V. Nelson, Orting, WA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 339 days.

(21) Appl. No.: 14/012,558

(22) Filed: Aug. 28, 2013

(65) Prior Publication Data

US 2014/0099589 A1 Apr. 10, 2014

Related U.S. Application Data

(60) Provisional application No. 61/710,295, filed on Oct. 5, 2012.

(51) Int. Cl.
| | | |
|---|---|---|
| *F28F 27/02* | (2006.01) | |
| *F24B 5/02* | (2006.01) | |
| *A21B 1/26* | (2006.01) | |
| *A21B 1/28* | (2006.01) | |

(52) U.S. Cl.
CPC . *F24B 5/028* (2013.01); *A21B 1/26* (2013.01); *A21B 1/28* (2013.01)

(58) Field of Classification Search
CPC ..................................................... F28F 27/02
USPC ........... 432/21, 27, 41, 55, 57, 162, 166, 170, 432/176, 199, 203, 212, 217; 99/473, 474
See application file for complete search history.

(56) References Cited

U.S. PATENT DOCUMENTS

| | | | | |
|---|---|---|---|---|
| 1,933,020 A | * | 10/1933 | Leamon | B01D 3/42 122/356 |
| 3,837,791 A | * | 9/1974 | Schoch | C21C 5/565 266/186 |
| 4,011,041 A | * | 3/1977 | Taylor | A24B 1/02 131/303 |
| 4,098,567 A | * | 7/1978 | Hubbert | F24H 3/065 431/115 |
| 4,255,132 A | * | 3/1981 | Carthew | F23G 5/46 432/2 |
| 4,317,290 A | * | 3/1982 | Voswinckel | C21D 9/56 34/213 |
| 4,324,545 A | * | 4/1982 | Hubbert | F23G 7/066 431/116 |
| 4,409,453 A | * | 10/1983 | Smith | A21B 1/245 219/400 |
| 4,427,374 A | | 1/1984 | Miller | |
| 4,782,214 A | * | 11/1988 | Voegtlin | A21B 1/24 126/21 A |
| 5,225,044 A | | 7/1993 | Breu | |
| 5,394,791 A | | 3/1995 | Vallee | |

(Continued)

FOREIGN PATENT DOCUMENTS

GB 2105459 3/1983

*Primary Examiner* — Gregory A Wilson
(74) *Attorney, Agent, or Firm* — Thompson Hine LLP

(57) ABSTRACT

An oven includes a cooking chamber, a gas-fired heat exchanger external of the cooking chamber and a flow path for circulating air from the cooking chamber past the heat exchanger to pick-up heat and then back to the cooking chamber under operation of a blower. A first combustion path gas flow path runs from the heat exchanger to an exhaust system for delivering combustion path gases away from the oven, and a second combustion path gas flow path runs from the heat exchanger to the cooking chamber for delivering combustion path gases into the cooking chamber. A control arrangement is configured to selectively control the flow of combustion path gases along at least one of the first combustion gas flow path or the second combustion gas flow path.

19 Claims, 3 Drawing Sheets

(56) References Cited

U.S. PATENT DOCUMENTS

| | | | |
|---|---|---|---|
| 5,562,022 A | 10/1996 | Schmid et al. | |
| 5,615,603 A * | 4/1997 | Polin | A21B 1/26 126/21 A |
| 5,617,839 A * | 4/1997 | Jennings | A21B 1/26 126/20 |
| 5,653,164 A | 8/1997 | Vallee | |
| 5,813,711 A | 9/1998 | Sauvagnat | |
| 5,906,855 A * | 5/1999 | Persson | A21B 1/44 126/41 A |
| 6,015,288 A | 1/2000 | Mundon | |
| 6,200,132 B1 | 3/2001 | Mundon | |
| 6,837,234 B2 | 1/2005 | Rabas et al. | |
| 6,854,457 B2 | 2/2005 | Rabas et al. | |
| 6,883,513 B2 | 4/2005 | Bock | |
| 7,049,568 B2 | 5/2006 | Jeong | |
| 7,094,995 B2 | 8/2006 | Mills | |
| 7,297,904 B2 | 11/2007 | Paller | |
| 7,301,130 B2 | 11/2007 | Mills | |
| 7,353,821 B2 | 4/2008 | Sakesena | |
| 7,527,051 B2 | 5/2009 | Schmitz | |
| 7,547,864 B2 | 6/2009 | Beausse | |
| 7,634,992 B2 | 12/2009 | Bujeau et al. | |
| 7,811,082 B2 | 10/2010 | Czajka et al. | |
| 7,875,834 B2 | 1/2011 | Bujeau et al. | |
| 8,138,459 B2 | 3/2012 | Beausse | |
| 8,151,697 B2 | 4/2012 | Valentine et al. | |
| 8,191,465 B2 | 6/2012 | Sager et al. | |
| 8,201,552 B2 | 6/2012 | Ploof et al. | |
| 8,354,620 B2 | 1/2013 | Frock et al. | |
| 8,375,848 B2 | 2/2013 | Valentine et al. | |
| 8,517,006 B2 | 8/2013 | Frock et al. | |

* cited by examiner

OVEN WITH RECIRCULATION OF COMBUSTION EXHAUST GASES

CROSS-REFERENCES

This application claims the benefit of U.S. Provisional Application Ser. No. 61/710,295, file Oct. 5, 2012, which is incorporated herein by reference.

TECHNICAL FIELD

This application relates generally to ovens used in commercial cooking environments such as bakeries, restaurants and retail food stores and, more specifically, to an oven that provides for selective and controlled recirculation of combustion exhaust gases to achieve higher efficiencies.

BACKGROUND

Commercial cooking ovens (e.g., such as rack ovens) commonly burn gaseous fuel and pass the combustion exhaust gases through heat exchange tubes of a heat exchanger and then up a stack and through an exhaust system to be delivered external to the oven. Cooking air is recirculated from the cooking chamber past the heat exchange tubes to pick-up heat, and the heated cooking air is then delivered back to the cooking chamber. The combustion exhaust gases may have a relatively high temperature (e.g., on the order of 625 to 725 degrees F. when the oven is set for operation at 525 degrees F.), and delivery of the combustion exhaust gases to the exhaust system represents wasted heat and, accordingly, reduced oven efficiency.

It would be desirable to provide an oven that makes use of the combustion exhaust gases after the heat exchange operation, so as to reduce the wasted heat and energy during oven operation.

SUMMARY

In one aspect, a method of heating a cooking chamber of an oven that includes a gaseous fuel heat exchanger involves: providing a flow path for circulating air from the cooking chamber past the heat exchanger to pick-up heat and then back to the cooking chamber; providing a first combustion path gas flow path from the heat exchanger to an exhaust system for delivering combustion path gases away from the oven; and providing a second combustion path gas flow path from the heat exchanger to the cooking chamber for delivering combustion path gases into the cooking chamber. The method involves selectively controlling flow of combustion path gases along at least one of the first combustion gas flow path or the second combustion gas flow path.

In one implementation of the method of the preceding paragraph, the method includes controlling flow as follows: (a) prior to initiating combustion, conducting a purge operation in which combustion path gases are delivered from the heat exchanger along the first combustion path gas flow path to the exhaust system and the combustion path gases are prevented from flowing along the second combustion gas flow path into the cooking chamber; and (b) after initiating combustion, (i) delivering air from the cooking chamber, across the heat exchanger to pick-up heat and then back to the cooking chamber and (ii) delivering at least some combustion path gases from the heat exchanger along the second combustion path gas flow path to the cooking chamber.

In one implementation of the method of any of the two preceding paragraphs, the first combustion path gas flow path includes a first draft inducing blower and a first damper downstream of the heat exchanger, and the second combustion path gas flow path includes a second draft inducing blower and a second damper downstream of the heat exchanger.

In one implementation of the method of the preceding paragraph, during step (b)(ii) the first draft inducing blower is turned off and the first damper is closed to inhibit gas flow along the first combustion gas flow path. During step (a) the second draft inducing blower is turned off and the second damper is closed to inhibit gas flow along the second combustion gas flow path.

In one implementation of the method of the any of the four preceding paragraphs, both the first draft inducing blower and the second draft inducing blower are mounted to a common draft inducing plenum, the common draft inducing plenum making up part of the first combustion path gas flow path and part of the second combustion path gas flow path. A first outlet of the common draft inducing plenum positioned to deliver gases through the first draft inducing blower and to the exhaust system, and a second outlet of the common draft inducing plenum positioned deliver gases through the second draft inducing blower and back to the cooking chamber.

In one implementation of the method of any of the five preceding paragraphs, the purge operation is triggered by a call for ignition (e.g., as may occur when the oven is first being heated up to a desired temperature, or as may occur during oven operation when combustion is cycled on and off according to monitored temperature of the cooking chamber).

In one implementation of the method of any of the six preceding paragraphs, the method further includes providing a flow path for delivering air from the cooking chamber to the exhaust system, the flow path including an inlet opening in a lower part of the cooking chamber.

In one implementation of the method of any of the seven preceding paragraphs, during combustion, one or more oven conditions are monitored (e.g., by sensors and a controller) in order to responsively and selectively control volume of combustion path gases that are delivered from the heat exchanger along the second combustion path gas flow path to the cooking chamber.

In one implementation of the method of any of the eight preceding paragraphs, during combustion, one or more oven conditions are monitored (e.g., by sensors and a controller) in order to responsively and selectively control whether combustion path gases are delivered (i) from the heat exchanger along the second combustion path gas flow path to the cooking chamber or (ii) from the heat exchanger along the first combustion gas flow path to the exhaust system.

In another aspect, an oven includes a cooking chamber, a gas-fired heat exchanger external of the cooking chamber, a flow path for circulating air from the cooking chamber past the heat exchanger to pick-up heat and then back to the cooking chamber under operation of a blower, a first combustion path gas flow path from the heat exchanger to an exhaust system for delivering combustion path gases away from the oven, a second combustion path gas flow path from the heat exchanger to the cooking chamber for delivering combustion path gases into the cooking chamber, and a control arrangement configured to selectively control the flow of combustion path gases along at least one of the first combustion gas flow path or the second combustion gas flow path.

In one implementation of the oven of the preceding paragraph. the first combustion path gas flow path includes a first draft inducing blower and a first damper downstream of the heat exchanger, and the second combustion path gas flow path includes a second draft inducing blower and a second damper downstream of the heat exchanger. The control arrangement is configured to control the first and second draft inducing blowers and the first and second dampers to determine where combustion path gases flow.

In one implementation of the oven of the preceding paragraph, both the first draft inducing blower and the second draft inducing blower are mounted to a common draft inducing plenum, such that the common draft inducing plenum makes up part of the first combustion path gas flow path and part of the second combustion path gas flow path. A first outlet of the common draft inducing plenum is positioned to deliver gases through the first draft inducing blower and to the exhaust system, and a second outlet of the common draft inducing plenum is positioned to deliver gases through the second draft inducing blower and back to the cooking chamber.

In one implementation of the oven of any of the three preceding paragraphs, the control arrangement is configured to control flow of combustion path gases as follows: (a) prior to initiating combustion, a purge operation is conducted in which combustion path gases are delivered from the heat exchanger along the first combustion path gas flow path to the exhaust system and the combustion path gases are prevented from flowing along the second combustion gas flow path into the cooking chamber; and (b) after initiating combustion, delivering at least some combustion path gases from the heat exchanger along the second combustion path gas flow path to the cooking chamber.

In one implementation of the oven of the preceding paragraph, the first combustion path gas flow path includes a first draft inducing blower and a first damper downstream of the heat exchanger, and the second combustion path gas flow path includes a second draft inducing blower and a second damper downstream of the heat exchanger. The control arrangement is configured such that during step (a) the second draft inducing blower is turned off and the second damper is closed to inhibit flow along the second combustion gas flow path.

In one implementation of the oven of the preceding paragraph, both the first draft inducing blower and the second draft inducing blower are mounted to a common draft inducing plenum, the common draft inducing plenum making up both part of the first combustion path gas flow path and part of the second combustion path gas flow path, a first outlet of the common draft inducing plenum positioned to deliver gases through the first draft inducing blower and to the exhaust system, and a second outlet of the common draft inducing plenum positioned to deliver gases through the second draft inducing blower and leading back to the cooking chamber.

In one implementation of the oven of any of the six preceding paragraphs, the control arrangement is configured to monitor one or more oven conditions during combustion, and selectively control volume of combustion path gases that are delivered from the heat exchanger along the second combustion path gas flow path to the cooking chamber.

In one implementation of the oven of any of the seven preceding paragraphs, the control arrangement is configured to monitor one or more oven conditions during combustion, and selectively control whether combustion path gases are delivered (i) from the heat exchanger along the second combustion path gas flow path to the cooking chamber or (ii) from the heat exchanger along the first combustion gas flow path to the exhaust system.

In one implementation of the oven of any of the eight preceding paragraphs, a flow path from the cooking chamber to the exhaust system is provided, the flow path including an inlet opening in a lower part of the cooking chamber.

The details of one or more embodiments are set forth in the accompanying drawings and the description below. Other features, objects, and advantages will be apparent from the description and drawings, and from the claims.

DETAILED DESCRIPTION

Figure 1:
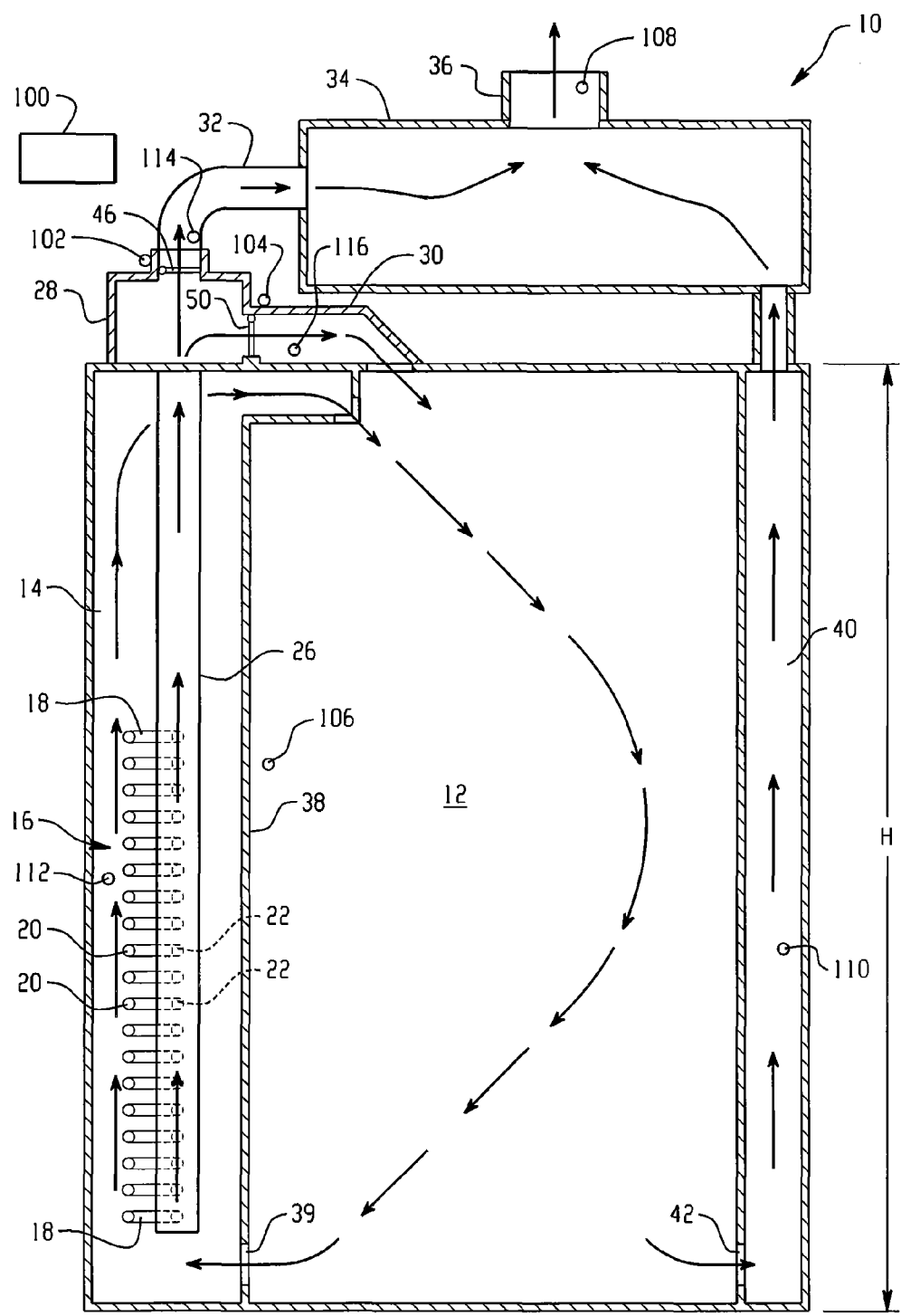
FIG. 1 shows a schematic elevation view of an oven.
Figure 2:
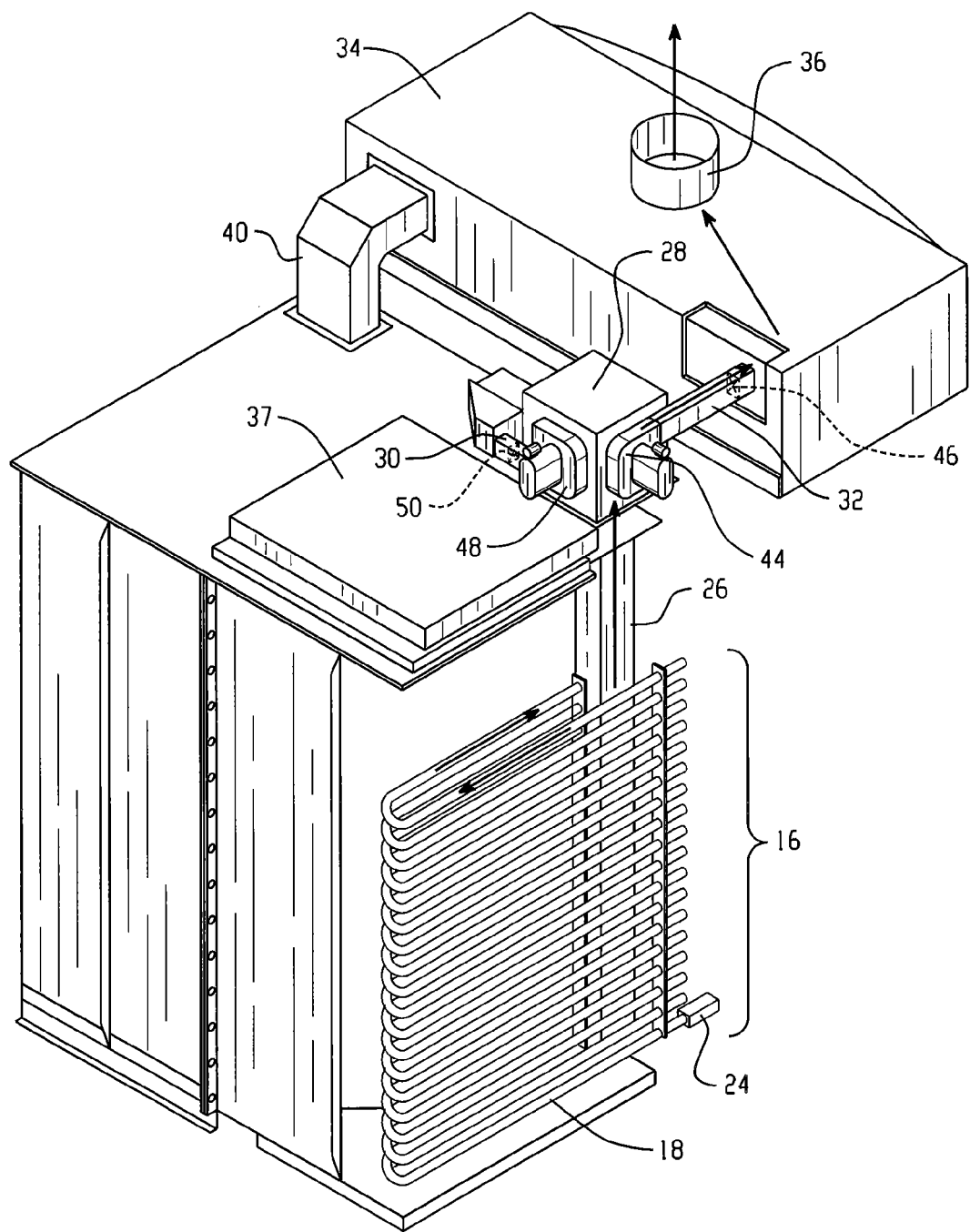
FIG. 2 is a partial perspective view of the oven demonstrating flow during a purge operation prior to initiating combustion.

Referring to FIG. 1, an oven 10 includes a cooking chamber 12 and a heat exchange chamber 14 alongside the cooking chamber. A heat exchanger 16 includes a plurality of heat exchange tubes 18 having inlet ends 20 and outlet ends 22. Each inlet end 20 may each have a respective gas-fired burner (e.g., 24 in FIG. 2) aligned therewith and each outlet end may be connected to a common stack 26. The exhaust stack 26 delivers combustion path gases upward into a plenum 28 from which two different flow paths may be followed. One flow path 30 leads to the cooking chamber 12 and the other flow path 32 leads to an exhaust system (e.g., here formed by an exhaust hood 34 with an outlet stack 36). Arrows showing flow along both paths are provided as representative of possible flow.

A wall 38 between the cooking chamber 12 and heat exchange chamber 14 includes one or more passages 39 that enable recirculation of air from the cooking chamber 12, past the heat exchanger 16 and then back to the cooking chamber. Per FIG. 2, a blower that provides recirculating flow across the heat exchanger may be located in an upper plenum 37. A flow path 40 is also provided for delivering air from the cooking chamber 12 to the exhaust hood 34, where the flow path includes an inlet opening 42 in a lower part of the cooking chamber (e.g., at a height that is no more than 20% the overall height H of the cooking chamber; or a height that is no more than 2 feet above a bottom of the cooking chamber, such as no more than 1.5 feet above the bottom of the cooking chamber).

During oven heating operations, the flow of combustion path gases is controlled (e.g., via a controller 100—shown schematically in FIG. 1) to follow either path 30 or path 32. Specifically, prior to initiating combustion, a purge operation is conducted per FIG. 2 in which combustion path gases are delivered from the heat exchanger along the combustion path gas flow path 32 to the exhaust hood 34. This purge assures that no build-up of gaseous fuel will be present when an ignition operation takes place. A series of interlocks assures, that during the purge cycle, the draft inducing blower 48 is turned off and damper 50 is closed. These interlocks assure that no unburned gases are introduced into the cooking chamber and that the heat exchanger is properly purged of unburned gases. This eliminates the need to also purge the cooking chamber, in addition to the heat exchanger, which would take substantially longer given that 4 changes of air are required prior to ignition.

Figure 3:
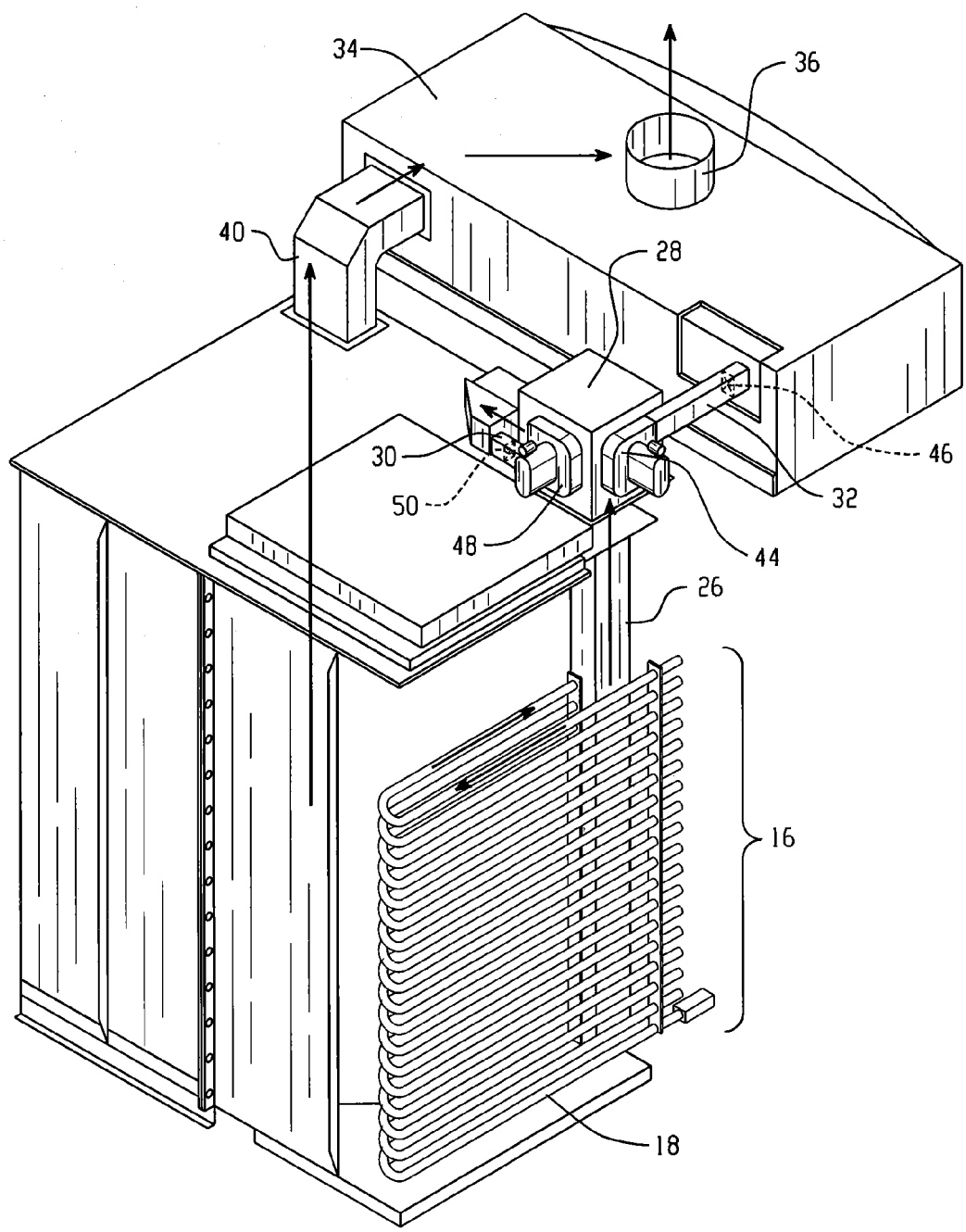
FIG. 3 is a partial perspective view of the oven demonstrating flow of combustion exhaust gases to the cooking chamber after initiation of combustion.

After initiating combustion, and as reflected in FIG. 3, air is delivered from the cooking chamber 12, across the heat exchanger 16 to pick-up heat and then back to the cooking chamber 12. At the same time, at least some combustion path gases are delivered from the heat exchanger 16 along the second combustion path gas flow path 30 to the cooking chamber. Thus, the flow back to the cooking chamber includes both air heated by passing external of the heat-exchange tubes, and combustion exhaust gases that are hot as a result of heat generated directly by combustion.

A draft inducing blower 44 and a damper 46 are both downstream of the heat exchanger 16 and form part of the flow path 32 to the exhaust hood. A draft inducing blower 48 and a damper 50 are both downstream of the heat exchanger 16 and form part of the flow path 30.

When the combustion exhaust gases are being delivered to the cooking chamber 12, (i) the draft inducing blower 44 is turned off and the damper 46 is closed to inhibit gas flow along the path 32 and (ii) the draft inducing blower 48 is turned on and the damper 50 is opened. When combustion path gases are being delivered to the hood, the draft inducing blower 48 is turned off and the damper 50 is closed to inhibit gas flow along the gas flow path 30 and (ii) the draft inducing blower 44 is turned on and the damper 46 is opened.

In the illustrated embodiment, both draft inducing blowers 44 and 48 are mounted to a common draft inducing plenum 28 that makes up both a part of the combustion path gas flow path to the exhaust hood and a part of the combustion path gas flow path back to the cooking chamber. One outlet of the common draft inducing plenum delivers combustion path gases through the draft inducing blower 44 and leads to the exhaust hood, while another outlet of the common draft inducing plenum delivers combustion path gases through the draft inducing blower 48 and leads to the cooking chamber 12.

It is recognized the combustion exhaust gases need not be delivered back to the cooking chamber at all times during combustion. For example, one or more oven conditions may be monitored during combustion, and a volume of combustion path gases that are delivered from the heat exchanger along the combustion path gas flow path 30 to the cooking chamber may be controlled by controlling, for example, how open each damper is and how fast each induction blower motor operates (e.g., both could be operated at the same time). Moreover, one or more oven conditions may be monitored during combustion to enable selective control of whether combustion path gases are delivered (i) from the heat exchanger along the second combustion path gas flow path 30 to the cooking chamber or (ii) from the heat exchanger along the first combustion gas flow path 32 to the exhaust system, such that only one flow path is followed at any given time, with the flow path potentially varying back and forth during cooking. Referring to FIG. 1, various sensors may be associated with the controller 100 for such purposes are shown, including damper position sensors 102 and 104, cooking chamber temperature sensor 106 and exhaust stack temperature sensor 108, a flow path flow and/or temperature sensor 110, a combustion sensor 112 and/or flow rate sensors 114 and 116 for each combustion gas flow path.

Utilizing the recirculation techniques and structure described above, it has been found that the temperature of combustion exhaust gases delivered up the outlet stack of the exhaust system can be significantly reduced (e.g., on the order of 525 to 575 degrees F. when the oven is set for operation at 525 degrees F.), resulting in more efficient oven operation and, accordingly, more economical oven operation.

It is to be clearly understood that the above description is intended by way of illustration and example only, is not intended to be taken by way of limitation, and that other changes and modifications are possible.

The invention claimed is:

1. A method of heating a cooking chamber of an oven that includes a gaseous fuel heat exchanger, the method comprising:

providing a flow path for circulating air from the cooking chamber past the heat exchanger to pick-up heat and then back to the cooking chamber;

providing a first combustion path gas flow path from the heat exchanger to an exhaust system for delivering combustion path gases away from the oven;

providing a second combustion path gas flow path from the heat exchanger to the cooking chamber for delivering combustion path gases into the cooking chamber;

cooking food within the cooking chamber and selectively controlling flow of combustion path gases along at least one of the first combustion gas flow path or the second combustion gas flow path.

2. The method of claim 1 wherein:

the first combustion path gas flow path includes a first draft inducing blower and a first damper downstream of the heat exchanger, the second combustion path gas flow path includes a second draft inducing blower and a second damper downstream of the heat exchanger, wherein the first and second draft inducing blowers and the first and second dampers are controlled to determine where combustion path gases flow.

3. The method of claim 2 wherein both the first draft inducing blower and the second draft inducing blower are mounted to a common draft inducing plenum, the common draft inducing plenum making up part of the first combustion path gas flow path and part of the second combustion path gas flow path, a first outlet of the common draft inducing plenum positioned to deliver gases through the first draft inducing blower and to the exhaust system, and a second outlet of the common draft inducing plenum positioned to deliver gases through the second draft inducing blower and back to the cooking chamber.

4. The method of claim 1, further comprising:

providing a flow path for delivering air from the cooking chamber to the exhaust system, the flow path including an inlet opening in a lower part of the cooking chamber.

5. The method of claim 1, further comprising:

monitoring one or more oven conditions during combustion, and selectively controlling volume of combustion path gases that are delivered from the heat exchanger along the second combustion path gas flow path to the cooking chamber.

6. The method of claim 1, further comprising:

monitoring one or more oven conditions during combustion, and selectively controlling whether combustion path gases are delivered (i) from the heat exchanger along the second combustion path gas flow path to the cooking chamber or (ii) from the heat exchanger along the first combustion gas flow path to the exhaust system.

7. A method of heating a cooking chamber of an oven that includes a gaseous fuel heat exchanger, the method comprising:

utilizing a flow path for circulating air from the cooking chamber past the heat exchanger to pick-up heat and then back to the cooking chamber;

utilizing a first combustion path gas flow path from the heat exchanger to an exhaust system for delivering combustion path gases away from the oven;

utilizing a second combustion path gas flow path from the heat exchanger to the cooking chamber for delivering combustion path gases into the cooking chamber;

selectively controlling flow of combustion path gases along at least one of the first combustion gas flow path or the second combustion gas flow path;

wherein flow of combustion path gases is controlled as follows:
(a) prior to initiating combustion, conducting a purge operation in which combustion path gases are delivered from the heat exchanger along the first combustion path gas flow path to the exhaust system, and the combustion path gases are prevented from flowing along the second combustion gas flow path into the cooking chamber;
(b) after initiating combustion,
(i) delivering air from the cooking chamber, across the heat exchanger to pick-up heat and then back to the cooking chamber;
(ii) delivering at least some combustion path gases from the heat exchanger along the second combustion path gas flow path into the cooking chamber.

8. The method of claim 7 wherein:
the first combustion path gas flow path includes a first draft inducing blower and a first damper downstream of the heat exchanger, during step (b)(ii) the first draft inducing blower is turned off and the first damper is closed to inhibit flow along the first combustion gas flow path;
the second combustion path gas flow path includes a second draft inducing blower and a second damper downstream of the heat exchanger, during step (a) the second draft inducing blower is turned off and the second damper is closed to inhibit flow along the second combustion gas flow path.

9. The method of claim 8 wherein both the first draft inducing blower and the second draft inducing blower are mounted to a common draft inducing plenum, the common draft inducing plenum making up part of the first combustion path gas flow path and part of the second combustion path gas flow path, a first outlet of the common draft inducing plenum positioned to deliver gases through the first draft inducing blower and to the exhaust system, and a second outlet of the common draft inducing plenum positioned to deliver gases through the second draft inducing blower and back to the cooking chamber.

10. The method of claim 7 wherein the purge operation is triggered by a call for ignition.

11. An oven, comprising:
a cooking chamber;
a gas-fired heat exchanger external of the cooking chamber, the heat exchanger including a plurality of heat exchange tubes;
a flow path for circulating air from the cooking chamber past the heat exchanger across the heat exchange tubes to pick-up heat and then back to the cooking chamber under operation of a blower;
a first combustion path gas flow path from the heat exchanger to an exhaust system for delivering combustion path gases away from the oven;
a second combustion path gas flow path from the heat exchanger to the cooking chamber for delivering combustion path gases into the cooking chamber;
a control arrangement configured to selectively control the flow of combustion path gases along at least one of the first combustion gas flow path or the second combustion gas flow path.

12. The oven of claim 11 wherein:
the first combustion path gas flow path includes a first draft inducing blower and a first damper downstream of the heat exchanger,
the second combustion path gas flow path includes a second draft inducing blower and a second damper downstream of the heat exchanger,
wherein the control arrangement is configured to control the first and second draft inducing blowers and the first and second dampers to determine where combustion path gases flow.

13. The oven of claim 12 wherein both the first draft inducing blower and the second draft inducing blower are mounted to a common draft inducing plenum, the common draft inducing plenum making up part of the first combustion path gas flow path and part of the second combustion path gas flow path, a first outlet of the common draft inducing plenum positioned to deliver gases through the first draft inducing blower and to the exhaust system, and a second outlet of the common draft inducing plenum positioned to deliver gases through the second draft inducing blower and back to the cooking chamber.

14. The oven of claim 11 wherein the control arrangement is configured to control flow of combustion path gases as follows:
(a) prior to initiating combustion, a purge operation is conducted in which combustion path gases are delivered from the heat exchanger along the first combustion path gas flow path to the exhaust system and the combustion path gases are prevented from flowing along the second combustion gas flow path into the cooking chamber;
(b) after initiating combustion, delivering at least some combustion path gases from the heat exchanger along the second combustion path gas flow path to the cooking chamber.

15. The oven of claim 14 wherein:
the first combustion path gas flow path includes a first draft inducing blower and a first damper downstream of the heat exchanger,
the second combustion path gas flow path includes a second draft inducing blower and a second damper downstream of the heat exchanger,
the control arrangement is configured such that during step (a) the second draft inducing blower is turned off and the second damper is closed to inhibit flow along the second combustion gas flow path.

16. The oven of claim 15 wherein both the first draft inducing blower and the second draft inducing blower are mounted to a common draft inducing plenum, the common draft inducing plenum making up both part of the first combustion path gas flow path and part of the second combustion path gas flow path, a first outlet of the common draft inducing plenum positioned to deliver gases through the first draft inducing blower and to the exhaust system, and a second outlet of the common draft inducing plenum positioned to deliver gases through the second draft inducing blower and leading back to the cooking chamber.

17. The oven of claim 11 wherein a flow path from the cooking chamber to the exhaust system is provided, the flow path including an inlet opening in a lower part of the cooking chamber.

18. An oven, comprising:
a cooking chamber;
a gas-fired heat exchanger external of the cooking chamber;
a flow path for circulating air from the cooking chamber past the heat exchanger to pick-up heat and then back to the cooking chamber under operation of a blower;
a first combustion path gas flow path from the heat exchanger to an exhaust system for delivering combustion path gases away from the oven;
a second combustion path gas flow path from the heat exchanger to the cooking chamber for delivering combustion path gases into the cooking chamber;

a control arrangement configured to selectively control the flow of combustion path gases along at least one of the first combustion gas flow path or the second combustion gas flow path, wherein the control arrangement is configured to monitor one or more oven conditions during combustion, and selectively control volume of combustion path gases that are delivered from the heat exchanger along the second combustion path gas flow path to the cooking chamber.

19. An oven, comprising:
a cooking chamber;
a gas-fired heat exchanger external of the cooking chamber;
a flow path for circulating air from the cooking chamber past the heat exchanger to pick-up heat and then back to the cooking chamber under operation of a blower;
a first combustion path gas flow path from the heat exchanger to an exhaust system for delivering combustion path gases away from the oven;
a second combustion path gas flow path from the heat exchanger to the cooking chamber for delivering combustion path gases into the cooking chamber;
a control arrangement configured to selectively control the flow of combustion path gases along at least one of the first combustion gas flow path or the second combustion gas flow path, wherein the control arrangement is configured to monitor one or more oven conditions during combustion, and selectively control whether combustion path gases are delivered (i) from the heat exchanger along the second combustion path gas flow path to the cooking chamber or (ii) from the heat exchanger along the first combustion gas flow path to the exhaust system.

* * * * *